(No Model.)

J., W. H. & R. J. CAMPBELL.
COVERING FOR WAGONS.

No. 473,292.　　　　　　　　　　Patented Apr. 19, 1892.

Witnesses

F. C. Woodward

W. G. McMillan

Inventors

Joseph Campbell
Wm. H. Campbell
Robt. J. Campbell
by Donald C. Ridout & Co.
Atty.

UNITED STATES PATENT OFFICE.

JOSEPH CAMPBELL, WILLIAM H. CAMPBELL, AND ROBERT J. CAMPBELL, OF TORONTO, CANADA.

COVERING FOR WAGONS.

SPECIFICATION forming part of Letters Patent No. 473,292, dated April 19, 1892.

Application filed November 23, 1891. Serial No. 412,856. (No model.)

*To all whom it may concern:*

Be it known that we, JOSEPH CAMPBELL, WILLIAM HARPER CAMPBELL, and ROBERT JOSEPH CAMPBELL, all of the city of Toronto, in the county of York, in the Province of Ontario, Canada, have invented a certain new and Improved Covering for Wagons and other Vehicles, of which the following is a specification.

The object of the invention is to design a cover for wagons and other vehicles which may readily be stowed away into a small space and at the same time always be ready for use; and it consists, essentially, of a cover connected to a spring-roll contained in a neat box attached to the side of the wagon or vehicle in such a manner that it may readily be drawn over the goods in the wagon or over a light frame made of bars detachably connected together in such a manner that they may be quickly put together when the frame is required or when not in use, and may be easily taken apart and stowed in a box made at the bottom of the vehicle, substantially as hereinafter more particularly explained and then definitely claimed.

Figure 1:
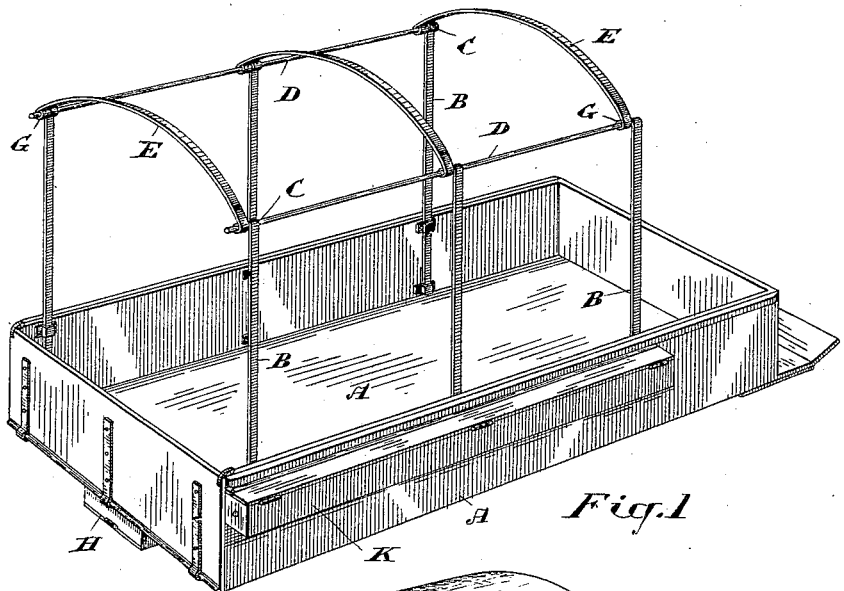
Figure 2:
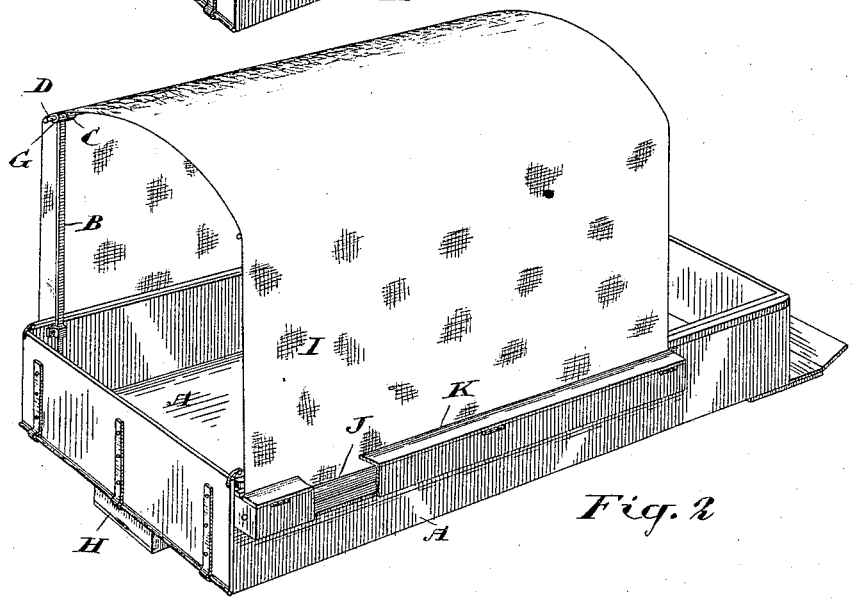

In the accompanying drawings, Figure 1 is a perspective view of a wagon provided with our improved detachable frame. Fig. 2 is a similar view with the cover pulled over the frame.

In the drawings, A represents the body of the wagon. B is a series of uprights fitted into sockets attached to the sides of the wagon. Each upright has an eye-bracket C connected to it, as indicated, through which eyes the top rail D of each side passes. The cross-rails E are also provided with eyes G, which fit into or over the top rails D, as indicated. When the frame thus made is not required for use, all the parts enumerated may be separated and stowed away in a box H, connected to the bottom of the wagon A, as shown.

I is a cover made of tarpaulin or any other suitable material and attached to the spring-roller J, which is suitably supported within the box K, which box has a narrow opening made in its top, through which the cover I may be drawn. When the goods in the wagon A require to be protected, the cover I is drawn out over them, or the frame, consisting of the parts already enumerated, may be erected and the cover I drawn over the frame thus constructed, the end of the said cover being preferably fastened to the side of the wagon opposite to that on which the spring-roller is situated.

What we claim as our invention is—

1. In a wagon, a skeleton frame comprising the uprights B, each secured at one end to the wagon and having an eye at its other end, top rails D, passing through said eyes, and cross-rails E, having eyes in their ends passing over said top rails D, and a cover I, substantially as described.

2. In a wagon, a skeleton frame comprising the uprights B, each secured at one end to the wagon and having an eye at its other end, top rails D, passing through said eyes, and cross-rails E, having eyes in their ends passing over said top rails D, and a cover I, secured to a roller journaled in a box fixed to one side of the wagon and adapted to extend over said skeleton frame and be secured to the other side, substantially as described.

Toronto, August 22, 1891.

JOSEPH CAMPBELL.
WILLIAM H. CAMPBELL.
ROBERT J. CAMPBELL.

In presence of—
I. EDW. MAYBEE,
W. G. MCMILLAN.